Nov. 13, 1934.   C. G. ECKHOLD   1,980,717
PROPELLER
Filed May 14, 1930

INVENTOR
C. G. ECKHOLD
BY *JHF Cook*
ATTORNEY

Patented Nov. 13, 1934

1,980,717

UNITED STATES PATENT OFFICE 1,980,717

PROPELLER

Charles G. Eckhold, Overland, Mo.

Application May 14, 1930, Serial No. 452,192

2 Claims. (Cl. 170—163)

This invention relates generally to propellers, and more specifically to propellers adapted for use with air and water craft, the predominant object of the invention being to provide a propeller of this type which is provided with adjustable blades whereby the pitch of said blades may be regulated.

Another extremely important feature of the invention is to produce a propeller of this type which is so constructed and arranged that the same lubricating medium which lubricates the moving engine parts within the engine housing serves also to lubricate the mechanism for adjusting the blades of the propeller.

Figure 1:
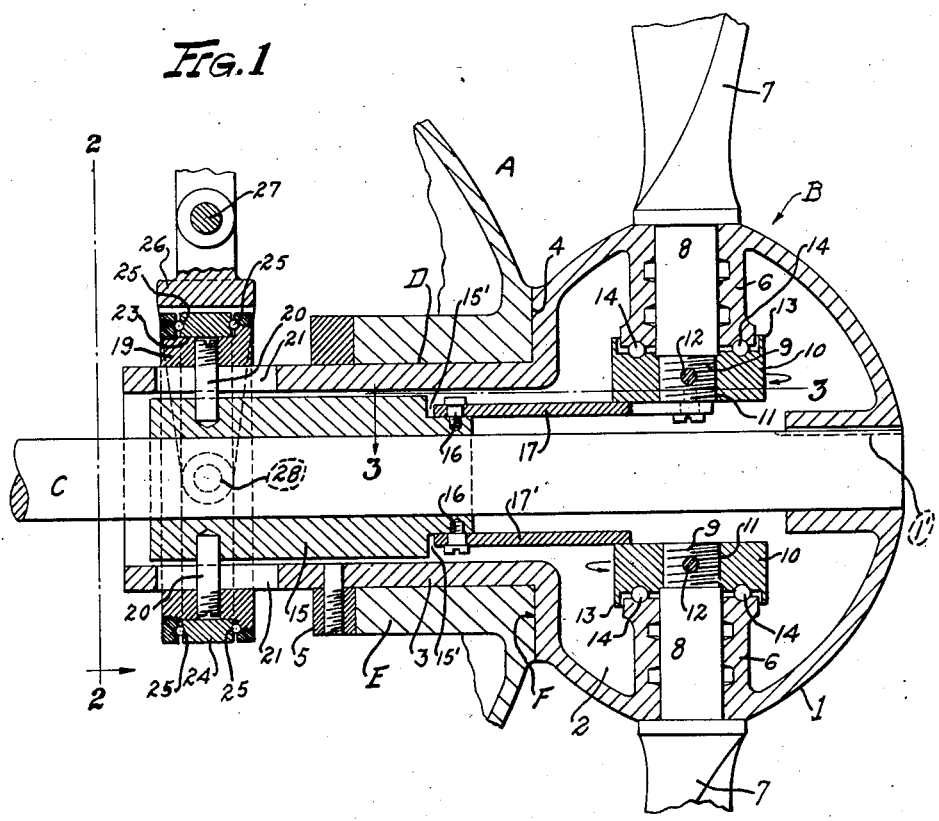
Fig. 1 is a fragmentary sectional view of my improved propeller in association with a portion of an engine.
Figure 2:
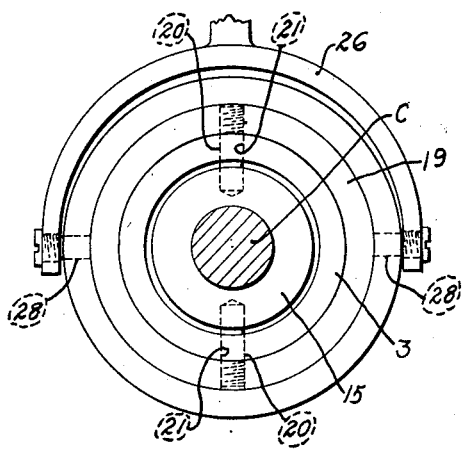
Fig. 2 is a section on line 2—2 of Fig. 1.

In the drawing, wherein is shown for the purpose of illustration, merely, one embodiment of the invention, A designates the housing of an engine with which my improved propeller B is associated. The engine referred to may be of any suitable construction and arrangement, and includes the usual drive shaft C to which axial rotation is imparted during operation of the engine.

Supported by the engine housing A is a propeller support 1 which is in the form of a hollow body comprised of a spinner portion 2 and a sleeve portion 3, said sleeve portion being extended through an aperture D formed in the wall of the engine housing and this aperture is surrounded by an inwardly extended, annular flange E. The engine housing A is provided with a shoulder F against which a flat face 4 of the propeller support 1 abuts, and 5 designates a collar which surrounds and is fixed to the sleeve portion 3 of the propeller support and abuts against the inner end face of the annular flange E of the engine housing. In view of the arrangement of the propeller support B with respect to the engine housing A, it is obvious that said propeller support may rotate axially relative to said engine housing, the outer face of the sleeve portion 3 and the inner wall of the aperture D being the bearing faces, and the shoulder F and collar 5 serving to prevent longitudinal movement of the propeller support with respect to the engine housing. The propeller support 1 is fixed to the drive shaft C by means of a key 1'.

The spinner portion 2 of the propeller support 1 is provided with inwardly extended, radial bearings 6 which rotatably support the blades 7 of the propeller, said blades including outer air contacting portions of the usual formation, and inner stud shaft portions 8 which are arranged in the bearings 6. The bearings 6 are provided with annular grooves 9 in which suitable packing material is arranged to prevent the leakage of lubricant around the stud shaft portions 8 of the blades. The inner ends of the stud shaft portions 8 of the blades 7 are screw-threaded, as indicated at 9 in Fig. 1, and disks 10, which are provided with screw-threaded openings 11, are screwed on said screw-threaded end portions 9, said disks being nonrotatably fixed to the portions 9 by means of pins 12, which pass through portions of the disks and through the portions 9 of the stud shaft portions 8 of the propeller blades. The disks 10 are provided with annular flanges 13 which embrace adjacent end portions of the bearings 6, as shown in Fig. 1. Also, the inner end faces of the bearings 6 and the adjacent faces of the disks 10 are provided with ball raceways in which antifriction balls 14 are arranged, which serve to induce free rotation of the disks with respect to the bearings.

Figure 3:
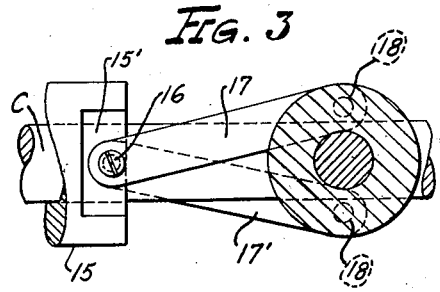
Fig. 3 is a section on line 3—3 of Fig. 1.

Mounted on the drive shaft C for sliding movement with respect thereto is a sleeve 15, which is provided with a pair of diametrically opposed depressions 15' having flat bottom faces. Pivotally connected at 16 to the sleeve 15 at the flat bottom faces of the depressions 15' is a pair of links 17 and 17'. The ends of the links opposite to the ends thereof which are connected to the sleeve 15 are pivotally secured at 18 to the disks 10, and as shown in Fig. 3 the link 17 is connected to the disk 10 associated therewith at one side thereof, while the link 17' is connected to its associated disk at the opposite side.

Arranged to circumscribe the sleeve portion 3 of the propeller support 1 is an annular member 19 which is movably supported by said sleeve portions so that it is capable of sliding longitudinally with respect thereto. The annular member 19 is provided with inwardly extended pins 20, the inner end portions of which project into correspondingly shaped recesses formed in the sleeve 15. The pins 20 are extended through elongated openings 21 formed in the wall of the sleeve portion 3 of the propeller support 1, and because of the arrangement described, movement of the annular member 19 longitudinally of the sleeve portion 3 will result in the sleeve 15 being subjected to like movement with respect to the shaft C. The annular member 19 is provided with screw-threaded portions adjacent to its opposite sides, on which annular flange members 22 are screwed.

The outer faces of the annular flange members 22 are substantially flush with the opposite side faces of the annular member 19 and are arranged in spaced relation transversely of said annular member, so that an annular depression 23 is provided which extends circumferentially of the annular member 19. 24 designates a ring which is located in the annular depression 23, the side faces of said ring and the inner faces of the annular flange members being provided with ball raceways in which antifriction balls 25 are arranged. The ring 24 is arranged in place by removing the rearmost flange member 22, which permits the ring to be moved longitudinally of the annular member 19 over the rearmost end thereof to its proper position, after which the rearmost flange member is replaced.

26 designates a forked operating member which is pivoted at 27 to a fixed part of the engine housing A, said operating member being pivotally attached by means of pins 28 to the ring 24 and having pivotally connected to its upper end suitable means (not shown) whereby said operating member may be operated from the position of the operator of the craft to move the ring 24 and annular member 19 longitudinally of the sleeve portion of the propeller housing.

In the operation of the device, the operator of the craft subjects the ring 24 and the annular member 19 to movement as described, and this movement is transmitted to the sleeve 15, which is moved longitudinally of the drive shaft C. The movement to which the sleeve 15 is subjected results in the disks 10 being rotated in opposite directions, as indicated by the arrows in Fig. 1, and because said disks are fixed to the portions 8 of the blades, said blades will be rotated axially in response to such movement of the disks. It is plain, therefore, that by actuating the operating member 26 in the proper manner the blades 7 of the propeller may be adjusted to any desired pitch, whereby the speed of operation of the craft may be regulated.

My improved propeller is of great utility in connection with air craft, inasmuch as the blades of the propeller may be adjusted to an angle where they will function as a brake for arresting movement of the air craft and thus permit landings to be made in relatively small fields.

A feature of my invention which is of extreme importance resides in the fact that the interior of the propeller support 1 is in communication, through the sleeve portion 3 thereof, with the interior of the engine housing A. Because of this arrangement the lubricant, which is located within the interior of the engine housing to lubricate the moving engine parts therein, may pass into the interior of the propeller support 1, through the open inner end of the sleeve portion 3 of said propeller support, and lubricate also the moving parts of the propeller. Thus the moving parts of the propeller are properly lubricated at all times when the engine casing in provided with lubricant. The lubricant is prevented from being discharged from the spinner portion 2 of the propeller support 1 during rotation of the propeller by suitable packing rings 8', which are seated in depressions in the bearings 6 and contact with the stud shaft portions 8 of the blades of the propeller.

I claim:

1. In combination with the housing of an internal combustion engine, a propeller comprising a hollow support, said support having a tubular portion which extends into said housing, blades adjustably supported by said support, the interior of said hollow support and the interior of the engine housing being in communication with each other through said tubular portion of said support so that lubricant may pass from the interior of the engine housing into the hollow support to lubricate mechanism associated with said adjustable blades.

2. In combination with a housing of an internal combustion engine, a propeller comprising a support having a tubular portion extended into said housing, blades adjustably supported by said support, said tubular portion of said support providing a passageway leading from the interior of said engine housing to within said support through which passageway lubricant passes from the engine housing for lubricating mechanism associated with said adjustable blades.

CHARLES G. ECKHOLD.